United States Patent
Ehrmann et al.

(10) Patent No.: US 9,248,929 B2
(45) Date of Patent: Feb. 2, 2016

(54) WORK STATION FOR A PACKAGING MACHINE AND TOOL CHANGING METHOD

(75) Inventors: Elmar Ehrmann, Bad Grönenbach (DE); Helmut Sparakowski, Tannheim (DE)

(73) Assignee: MULTIVAC SEPP HAGGENMUELLER GMBH & CO. KG, Wolfertschwenden (DE)

(*) Notice: Subject to any disclaimer, the term of this patent is extended or adjusted under 35 U.S.C. 154(b) by 938 days.

(21) Appl. No.: 13/468,591

(22) Filed: May 10, 2012

(65) Prior Publication Data
US 2012/0289388 A1 Nov. 15, 2012

(30) Foreign Application Priority Data
May 10, 2011 (DE) .......................... 10 2011 101 053

(51) Int. Cl.
| | |
|---|---|
| *B23Q 3/155* | (2006.01) |
| *B65B 59/04* | (2006.01) |
| *B29C 33/30* | (2006.01) |
| *B29C 33/34* | (2006.01) |
| *B65B 9/04* | (2006.01) |
| *B30B 15/02* | (2006.01) |
| *B29C 33/32* | (2006.01) |
| *B21D 37/14* | (2006.01) |
| *B29C 51/08* | (2006.01) |
| *B65B 59/02* | (2006.01) |

(52) U.S. Cl.
CPC .............. *B65B 59/04* (2013.01); *B21D 37/147* (2013.01); *B29C 33/30* (2013.01); *B29C 33/306* (2013.01); *B29C 33/32* (2013.01); *B29C 51/082* (2013.01); *B30B 15/028* (2013.01); *B65B 9/04* (2013.01); *B65B 59/02* (2013.01); *B29C 33/308* (2013.01); *Y10T 483/10* (2015.01); *Y10T 483/15* (2015.01); *Y10T 483/17* (2015.01); *Y10T 483/1729* (2015.01)

(58) Field of Classification Search
CPC ..................... Y10T 483/1729; Y10T 483/1731
USPC ....................................... 483/28–29
See application file for complete search history.

(56) References Cited

U.S. PATENT DOCUMENTS

| | | | | |
|---|---|---|---|---|
| 3,207,065 | A * | 9/1965 | Danly ..................... | B21D 37/14 100/229 R |
| 5,330,409 | A * | 7/1994 | Futamura ............. | B21D 37/145 483/29 |
| 5,619,913 | A * | 4/1997 | Padovani .............. | B29C 31/006 100/215 |

(Continued)

FOREIGN PATENT DOCUMENTS

| | | |
|---|---|---|
| DE | 1586223 A1 | 7/1970 |
| DE | 9017161 U1 | 2/1991 |

(Continued)

*Primary Examiner* — Erica E Cadugan
(74) *Attorney, Agent, or Firm* — Husch Blackwell LLP

(57) ABSTRACT

The present invention relates to a work station for a packaging machine, comprising an upper tool and a lower tool arranged below the upper tool. These tools are configured for acting on a packaging web. A lifting unit is able to move the upper tool and/or the lower tool such that, at a specific position, the two tools abut on one another or are only spaced apart at a small distance. According to the present invention, the two tools are adapted to be coupled to one another by a releasable coupling at this position so that they can be removed from the work station in common. The invention also relates to a corresponding method for removing a lower tool from a work station, e.g. for the purpose of tool exchange.

11 Claims, 5 Drawing Sheets

(56) References Cited

U.S. PATENT DOCUMENTS

| | | |
|---|---|---|
| 5,755,653 A | 5/1998 | Nishida |
| 5,940,953 A * | 8/1999 | Arends .................. B23Q 3/155 |
| | | 280/35 |
| 2013/0212988 A1 * | 8/2013 | Schmeiser .............. B65B 7/164 |
| | | 53/558 |
| 2015/0096263 A1 * | 4/2015 | Ehrmann ................ B65B 41/18 |
| | | 53/411 |
| 2015/0174815 A1 * | 6/2015 | Izquierdo Ereno ... B29C 51/087 |
| | | 264/39 |

FOREIGN PATENT DOCUMENTS

| | | |
|---|---|---|
| DE | 19917853 A1 | 11/2000 |
| DE | 202006010803 U1 | 10/2006 |
| DE | 102007013698 A1 | 6/2008 |
| DE | 102008035223 A1 | 2/2010 |
| DE | 102009022545 B3 | 12/2010 |
| EP | 0895933 A1 | 2/1999 |
| EP | 2110219 A1 | 10/2009 |

* cited by examiner

WORK STATION FOR A PACKAGING MACHINE AND TOOL CHANGING METHOD

CROSS-REFERENCE TO RELATED APPLICATION

This Application claims priority to German Application Number 102011101053.3 filed May 10, 2011 to Elmar Ehrmann and Helmut Sparakowski entitled "Work Station for a Packaging Machine and Tool Changing Method," currently pending, the entire disclosure of which is incorporated herein by reference.

TECHNICAL FIELD

The present invention relates to a work station for a thermoform packaging machine and to a method of removing a lower tool from a work station.

BACKGROUND

Packaging machines for packaging articles to be packed with a packaging web material are known to a sufficient extent. For example, DE 10 2007 013 698 A1 or DE 10 2009 022 545 A1 disclose thermoform machines as a special type of packaging machines. In these thermoform packaging machines, packaging troughs are thermoformed in a bottom film/foil, filled with a product or articles to be packed, and subsequently sealed with a lidding web. After having been sealed, the packages are separated from one another. To this end, cutting units are normally provided in the longitudinal and in the transverse direction of the working direction of the packaging machine. Such thermoform packaging machines normally comprise a plurality of work stations, for example, a forming station for forming packaging troughs, a sealing station for sealing the lidding web to the bottom film as well as one or a plurality of cutting stations. Also other types of packaging machines, such as tray sealers, comprise one or a plurality of work stations, in particular for sealing packages and, if necessary, for evacuating and/or flushing the packages with gas before they are sealed.

SUMMARY OF THE INVENTION

For the purpose of maintenance or for changing the format, i.e. for changing the tools of the work station so as to produce a different format of packages, it may be necessary to remove the tool of a work station from the station in question. This is particularly complicated and leads to particularly long downtimes of the packaging machine in cases in which the work station comprises, as its tools, an upper tool and a lower tool arranged below said upper tool. In such cases, the lower tool has hitherto only been accessible for the purpose of removal, when the upper tool has been removed first.

It is the object of the present invention to provide a work station and a method, which reduce, with means having the simplest possible structural design, the amount of work required for removing or exchanging a tool part.

This object is achieved by a work station having the features of the present invention and by a method for removing a lower tool from a work station having the features of the present invention. Advantageous further developments of the invention are also disclosed.

The work station according to the present invention has provided therein a lifting unit for moving at least one of the upper and lower tools between at least one lowered position and at least one raised position. Depending on whether both tool parts are movable by the lifting unit, or which of the two tool parts is movable by the lifting unit, one of these two positions corresponds to a closed position of the tool defined by the upper and lower tools in common. In said closed position, the upper and lower tools either abut on one another directly or are only spaced apart at a very small distance, whereas, in the other, open position, the two tool parts are spaced apart at a larger distance. For example, a packaging web can be conveyed through the tool at the open position of the tool, whereas, at the closed position, the upper and lower tools act on the packaging web so as to form packaging troughs therein.

According to the present invention, the upper tool and the lower tool are in the closed position, i.e. in the position in which they abut on one another or are spaced apart at a smaller distance than in the other, open position, adapted to be coupled to one another by a releasable coupling so that they can be removed from the work station in common. Especially the lower tool can thus be removed much easier and an exchange of tools is substantially facilitated. Instead of the necessity of removing first the upper tool and subsequently the lower tool, it is now possible to remove the upper and the lower tool in common from the work station in a single operating step. Also a reinsertion of the upper and lower tools in the work station can be accomplished with one operating step less. This reduces the amount of work for tool exchange operations and downtimes of the work station and of the whole packaging machine are reduced to a substantial extent.

Preferably, the coupling comprises mechanical and/or magnetic fastening elements by means of which the upper tool and the lower tool can releasably be coupled to one another. Such mechanical and/or magnetic fastening elements can take up the weight of the lower tool in a particularly effective manner, when said lower tool is coupled to the upper tool and raised.

According to a variant having a comparatively simple structural design, the coupling may comprise one or a plurality of screws. Preferably, a plurality of screws is provided so that the weight of the lower tool can be carried at several points. These screws may be tension screws, which are screwed through one of the two tool parts into the other tool part by an operator of the work station.

According to a more convenient variant, the coupling comprises at least one electromagnet. This electromagnet can have power supplied thereto and can be activated, e.g. by connecting an external power supply to one of the two tool parts. It can then cooperate with a complementary countermagnet on the respective opposite tool part. This embodiment is advantageous insofar as only the power supply for the electromagnet has to be connected and/or a switch operated for coupling the lower tool to the upper tool, so that this kind of coupling is very convenient for the operator of the work station.

Another just as convenient variant would be a variant in which the coupling includes at least one positively locking, preferably controllable, mechanical locking device. Also such a controllable locking device reduces the amount of work for the operator of the machine when the upper and lower tools are being coupled. The locking device may include locking elements or a latch which, when adequately controlled, comes into engagement with a complementary locking element at the opposite tool part so as to couple the two tool parts to one another.

It would be imaginable that such a controllable mechanical locking device is adapted to be driven manually, electrically and/or by means of pressurized air. The two last mentioned variants require a supply of power and/or pressurized air to at least one of the two tool parts, but they also offer the advantage that the controllable locking device can be operated more conveniently. Current and pressurized air supply units are normally provided in the area of packaging machines anyhow.

According to an expedient embodiment, two lateral transport chains for the packaging web are provided, and, in a direction transversely to the direction of transport of the packaging web, the maximum dimension of the lower tool is smaller than the distance between the two transport chains, since it is thus possible to raise the lower tool between the two transport chains in an upward direction and to remove it from the work station, without it being necessary to remove the transport chain, let alone one of the lateral chain guides, from the work station for said raising of the lower tool.

In the case of one variant of the work station according to the present invention, the lower tool is adapted to be raised and lowered by means of the lifting unit and the lower tool is adapted to be releasably connected to the lifting unit. This allows the lower tool to be not only placed loosely on the lifting unit but to be firmly connected to said lifting unit so as to allow a more exact movement and positioning of the lower tool and improve the operation of the work station in this way.

According to a preferred embodiment, an adjustment unit is provided for adjusting the position of the upper tool and/or lower tool in a direction of transport of the packaging web, i.e. normally in the longitudinal direction of the work station. This allows the work station to be adjusted to various unwinding lengths of the packaging web in a packaging machine, i.e. to various feed lengths of the packaging material during one work cycle in the case of an intermittent mode of operation of the work station.

As regards such an adjustment unit, it is particularly advantageous when said adjustment unit includes at least one guide rail so that the upper and/or the lower tool can be displaced more easily and also positioned more precisely.

The ease of use for the operator, of the work station can be improved still further in that, at least one predetermined tool changing position at the work station, a tool changing carriage can, at least partially, be moved into the work station. Such a tool changing carriage can substantially facilitate the removal of the upper and lower tools. It is often provided with a cantilever that is positioned above the two tools. This cantilever can be connected to the tool parts which have already been coupled to one another, and raised so as to remove the upper and lower tools from the work station. The use of such a tool changing carriage and a tool changing position which allows said tool changing carriage to enter the work station more easily are particularly advantageous in the case of the work station according to the present invention, since, in accordance with the present invention, the upper and lower tools are coupled to one another and the weight of both said tools must be lifted for removing the tool parts.

The invention also relates to a packaging machine comprising a work station according to one of the above-described variants, and to a method of removing a lower tool from a work station of a packaging machine. The work station comprises here an upper tool and a lower tool arranged below said upper tool, a lifting unit being provided for moving at least one of said two tool parts between a lowered position and at least one raised position so that, in one of the two positions, said upper and lower tools abut on one another or are spaced apart at a smaller distance than in the other position, whereas in said other position they are spaced apart at a larger distance. The method according to the present invention is characterized in that the upper tool and the lower tool are coupled in the position in which they abut on one another or are spaced apart at a smaller distance than in the other position, said coupling being effected by a releasable coupling, and in that the upper tool and the lower tool coupled to said upper tool are removed from the work station in common. This method offers the advantages which have already been described hereinbefore, in particular a reduction of the operating steps required for changing the lower tool.

It is especially imaginable that, when the lower tool is being removed from the work station, it is raised in an upward direction between two lateral transport chains. It is thus possible to carry out the tool exchange and the removal of the lower tool, respectively, without the necessity of removing the transport chains or a chain guide provided for guiding these transport chains.

As has already been described, additional advantages are obtained when a tool changing carriage is moved into the work station, at least partially, and removes the upper tool and the lower tool coupled to said upper tool from the work station.

BRIEF DESCRIPTION OF THE DRAWINGS

In the following, an advantageous embodiment of the invention will be explained in more detail with reference to a drawing, in which the individual figures show.

Identical components are designated by identical reference numerals throughout the figures.

DETAILED DESCRIPTION OF THE INVENTION

Figure 1:
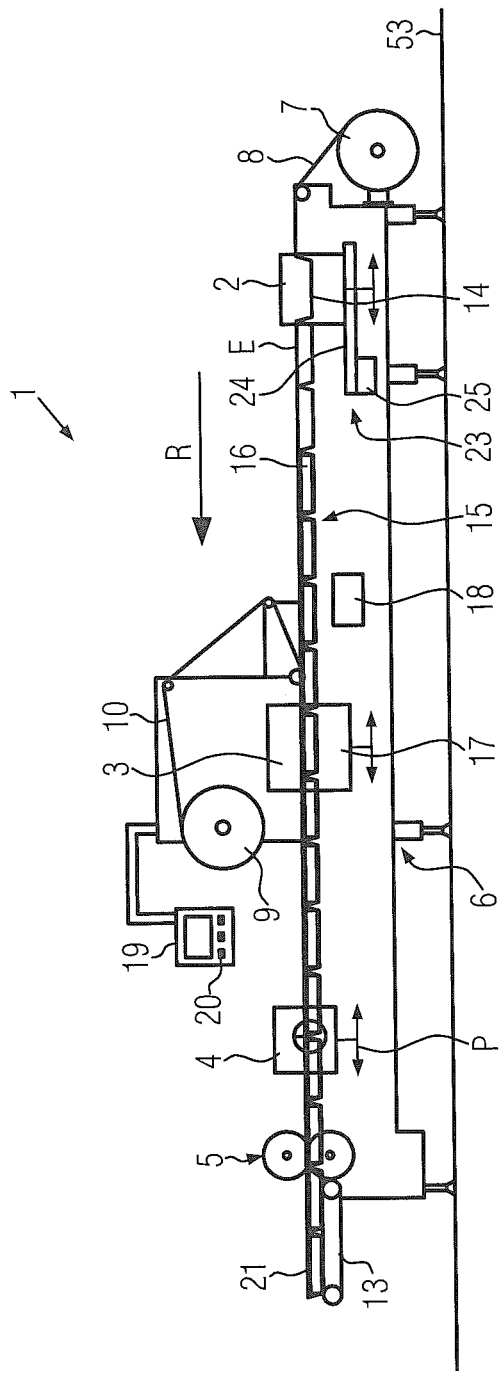
FIG. 1 an embodiment of a packaging machine according to the present invention in the form of a thermoform packaging machine, FIG. 2 a schematic representation of a work station according to the present invention at the open position of the tool, FIG. 3 a schematic representation of the work station shown in FIG. 2 in the closed condition of the tool, FIG. 4 a representation of the work station shown in FIGS. 2 and 3 with a tool changing carriage and tool parts that are coupled to one another and FIG. 5 a schematic view of the work station in a condition in which the upper and lower tools have been raised.

FIG. 1 shows a schematic view of a packaging machine 1 in the form of a thermoform packaging machine. This thermoform packaging machine 1 comprises a forming station 2, a sealing station 3, a cross cutting unit 4 and a longitudinal cutting unit 5 which are arranged on a machine frame 6 in a working direction R in this sequence. The cross cutting unit 4 according to this embodiment is implemented as a cutting unit according to the present invention, which will be described in more detail hereinbelow.

On the input side, the machine frame 6 has provided thereon a supply roll 7 from which a first web-shaped packaging material 8 is unwound. In the area of the sealing station 3, a material storage unit 9 is provided, from which a second web-shaped material 10 is unwound as a lidding web. On the output side, a discharge device 13 in the form of a conveyor belt is provided at the packaging machine, with which finished, singulated packages 21 are transported away. Furthermore, the packaging machine 1 comprises a feed device, which is not shown, said feed device gripping the first web-shaped material 8 and transporting it cyclically in a main work cycle in the working direction R. The feed device can be realized, for example, by laterally arranged transport chains.

In the embodiment shown, the forming station 2 is configured as a thermoforming station in which containers 14 are formed in the first web-shaped material 8 by thermoforming.

The forming station 2 can be configured such that in the direction perpendicular to the working direction R several containers are formed side by side. An infeed line 15, along which the containers 14 formed in the first web-shaped material 8 are filled with a product 16, is arranged downstream of the forming station 2 in the working direction R.

The sealing station 3 is provided with a closable chamber 17 in which the atmosphere in the containers 14 can, prior to sealing, be substituted by a substitute gas or a substitute gas mixture, e.g. by means of gas flushing.

The cross cutting unit 4 is implemented as a punch which cuts through the first web-shaped material 8 and the second web-shaped material 10 between neighbouring containers 14 in a direction transversely to the working direction R. In so doing, the cross cutting unit 4 works such that the first web-shaped material 8 is not cut through across the whole width thereof, but remains uncut at least in a boundary area thereof. This allows controlled further conveyance by the feed device.

In the embodiment shown, the longitudinal cutting unit 5 is implemented as a knife unit by means of which the first web-shaped material 8 and the second web-shaped material 10 are cut through between neighbouring containers 14 and at the lateral boundary of the first web-shaped material 8 so that singulated packages 21 are obtained downstream of the longitudinal cutting unit 5.

The packaging machine 1 is additionally provided with a controller 18. This controller 18 has the function of controlling and monitoring the processes taking place in the packaging machine 1. A display device 19 with control elements 20 is used for visualizing for an operator and influencing by an operator the sequences of processes taking place in the packaging machine 1.

The general mode of operation of the packaging machine 1 is briefly described hereinbelow.

The first web-shaped material 8 is unwound from the supply roll 7 and conveyed into the forming station 2 by the feed device. In said forming station 2, containers 14 are formed in the first web-shaped material 8 by thermoforming. The containers 14 are, together with the surrounding area of the first web-shaped material 8, advanced in a main work cycle to the infeed line 15, where they are filled with a product 16.

Subsequently, the filled containers 14 are, together with the surrounding area of the first web-shaped material 8, advanced by the feed device into the sealing station 3 in said main work cycle. After having been sealed to the first web-shaped material 8, the second web-shaped material 10 is, as a lidding web, advanced with the feed movement of the first web-shaped material 8. In the course of this process, the second web-shaped material 10 is unwound from the material storage unit 9. By sealing the lidding web 10 to the containers 14, closed packages 21 are obtained.

In the cutting units 4, 5, the packages 21 are singulated by cutting through the webs of material 8, 10 in the transverse and in the longitudinal direction, respectively. The cross cutting unit 4 is an example of a cutting unit according to the present invention.

As indicated by the double arrows P, the work stations 2, 3, 4 of the packaging machine 1 can be displaced in the direction of transport R. This allows the work stations 2, 3, 4 to be adjusted to various unwinding lengths of the packaging webs 8, 10, i.e. to various feed lengths of the packaging webs 8, 10 during a single work cycle in the case of an intermittent mode of operation of the packaging machine 1. Due to the adjustability of the work stations 2, 3, 4 it can especially be guaranteed that, even if the unwinding lengths should be changed, the tool of each work station 2, 3, 4 will attack at an integer multiple of the new unwinding length. In order to allow this adjustment in the direction of transport R and the longitudinal direction of the packaging machine 1, an adjustment unit 23 can be provided for each work station, said adjustment unit 23 being schematically indicated only for the forming station 2 in FIG. 1, but it may also be provided on the sealing station 3 or the cutting station 4 in a corresponding manner.

Such an adjustment unit 23 especially comprises one or a plurality of guide rails 24, on which the tools or the whole work station 2 can be displaced in the direction of transport R, and a drive 25 for causing the adjusting movement. This drive 25 may e.g. be a servomotor by means of which the respective work station 2, 3, 4 or its tool can be displaced along the guide rails 24. The servomotor 25 can be controlled for adjusting a specific, predetermined operating position of the tool. In particular, it would be imaginable that all the drives 25 of all adjustment units 23 of all work stations 2, 3, 4 are controlled by means of the common machine control 18 so as to match the positions of the respective work stations 2, 3, 4 with one another.

Figure 2:
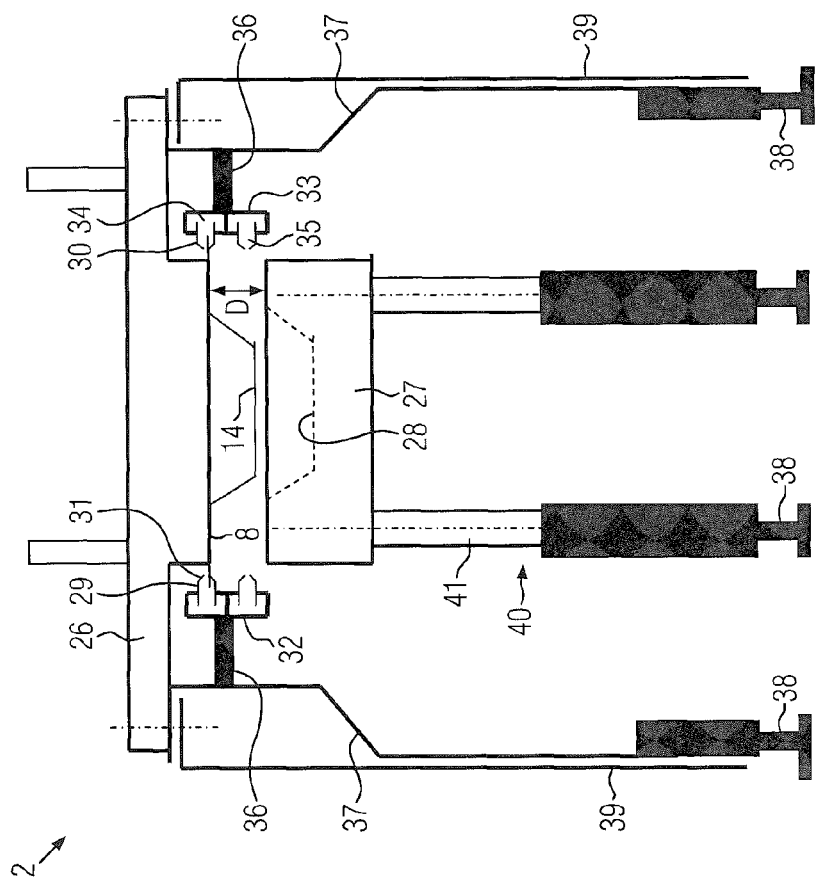

FIG. 2 schematically shows in the direction of transport R the forming station 2 of the packaging machine 1 shown in FIG. 1, as an example of a work station according to the present invention. This forming station 2 is provided with an upper tool 26 and a lower tool 27, which are able to act in common on the bottom film/foil or packaging web 8 so as to form packaging troughs 14 therein. To this end, the lower tool 27 arranged below the upper tool 26 may include a thermoforming mold 28 into which the packaging web 8 is thermoformed so as to form the troughs 14. This thermoforming can be executed by applying a vacuum within the lower tool 27 and/or by applying an overpressure to the packaging web 8 from the upper tool 26.

For laterally clamping and for laterally tensioning the packaging web 8, a clamp or transport chain 29, 30 is provided on either of the two sides of the packaging web 8. Each transport chain 29, 30 extends in the direction of transport R of the packaging machine 1 through the work station 2 and is provided with clamping elements 31 for clamping the packaging web 8 in position. A first chain guide 32 guides and stabilizes the first chain 29, whereas a second chain guide 33 guides and stabilizes the second chain 30 on the opposite side of the packaging web 8. Each chain guide 32, 33 guides the upper run 34 of the respective transport chain 29, 30, which clamps and conveys the packaging web 8, as well as the lower run 35 of the transport chain 29, which runs back in the chain guide 32, 33.

Each of the two chain guides 32, 33 is secured to a lateral holding profile 37 via fastening elements 36. This holding profile 37 rests on a floor space with legs 38 and is covered towards the outside by a cladding panel 39.

A lifting unit 40 is provided in the work station 2 and serves to lift and lower the lower tool 27. The lifting unit 40 comprises a plurality of telescope bars 41, which are adapted to be driven pneumatically or hydraulically and which carry the lower tool 27 or a platform supporting said lower tool 27. Also the telescope bars 41 rest on a floor space with legs 38.

By means of the lifting unit 40, the lower tool 27 can be raised and lowered. This means that the forming station tool, which is defined by the upper and lower tools 26, 27 in common, can be moved between an open position and a closed position. The open position is characterized in that the two tool parts 26, 27 are spaced apart at a distance D which is larger than the distance existing between these two tool parts 26, 27 in the closed position. The open position of the tool is shown in FIG. 2. In said FIG. 2, the two tool parts 26, 27, i.e. the upper tool 26 and the lower tool 27, are spaced apart at a comparatively large distance D. This distance is large enough for conveying between the two tool parts the packaging troughs 14 formed in the packaging web 8.

Figure 3:
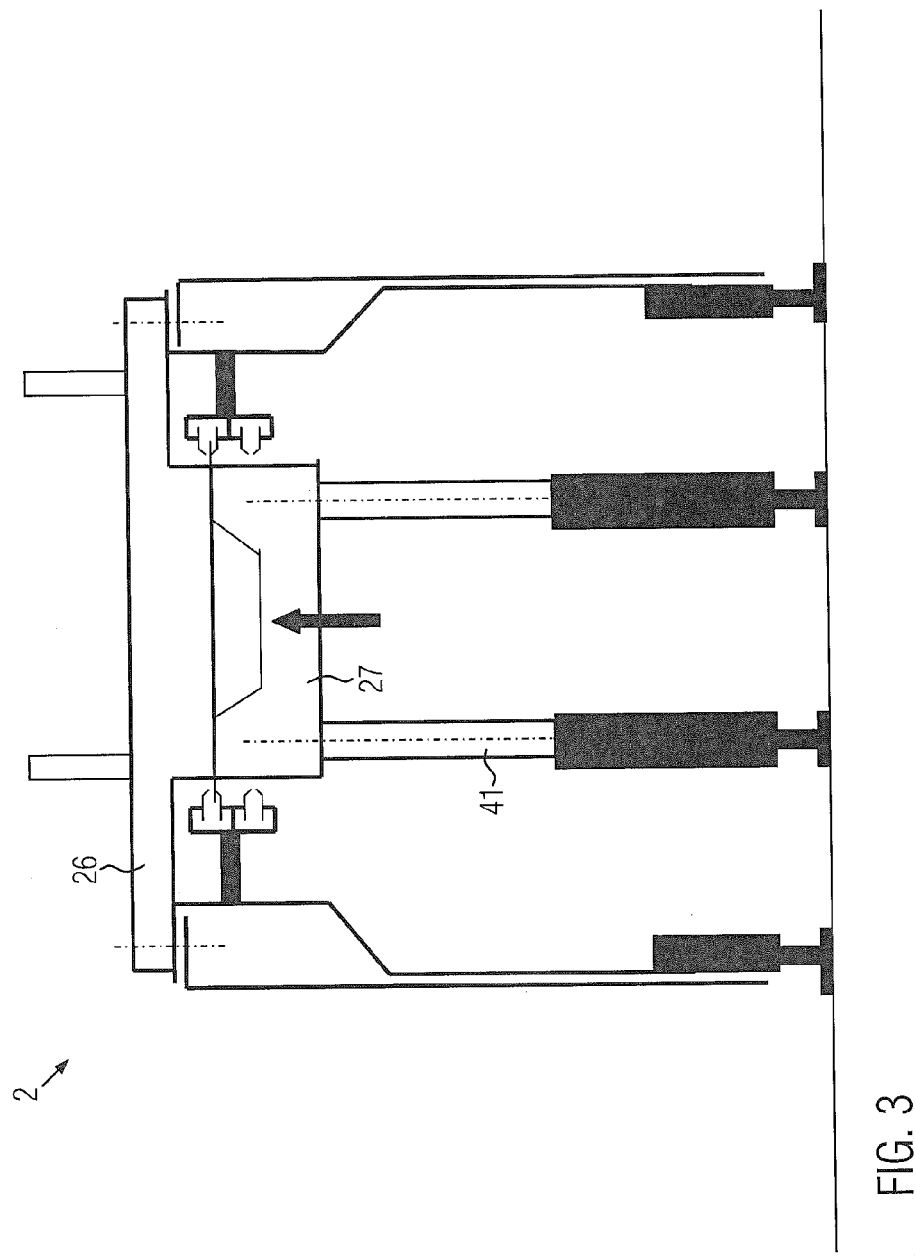

FIG. 3, however, shows the tool of the forming station 2 in its closed position. In this position, the upper tool 26 and the lower tool 27 abut on one another, or they are only spaced apart at a minimum distance, which is a distance in the range of the thickness of the packaging web 8. In this closed position of the tool, the upper and lower tools 26, 27 act on the packaging web 8. The upper tool 26 can be provided with a heating unit (not shown) for heating the packaging web 8. The extension of the telescope bars 41 of the lifting unit 40 executed for raising the lower tool 27 is indicated in FIG. 3 by an arrow.

Figure 4:
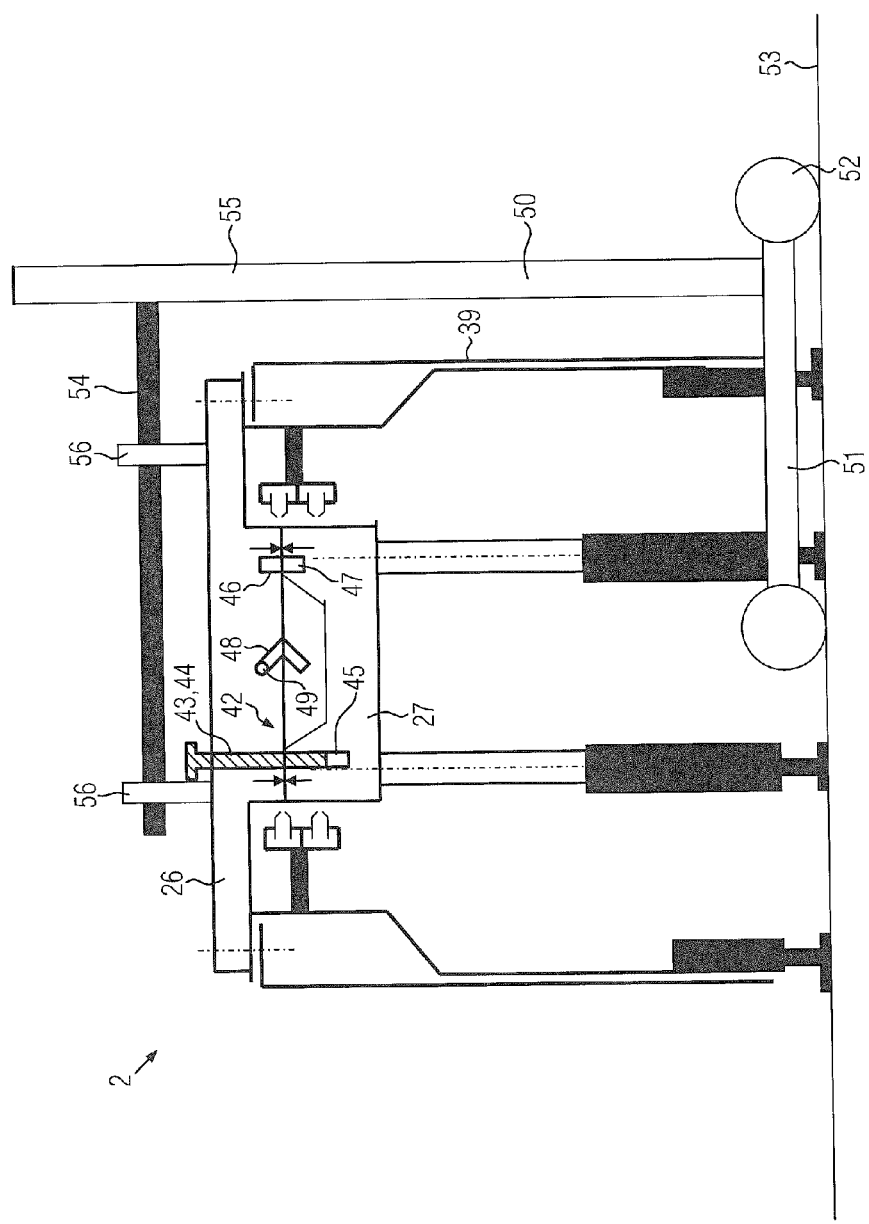

Also in FIG. 4, the work station tool, which comprises the upper and lower tools 26, 27, is in its closed position, in which the upper tool 26 and the lower tool 27 abut on one another. In FIG. 4 it is additionally shown that a coupling 42 is provided for releasably coupling the upper tool 26 and the lower tool 27. This coupling 42 is provided on the interface between the upper tool 26 and the lower tool 27. The coupling 42 may comprise a plurality of releasable mechanical and/or magnetic fastening elements 43. A tension screw 44 is shown as an example of a mechanical fastening element 43, said tension screw 44 being able to pass through a hole in the upper tool 26 and to be brought into engagement with a female thread of a hole 45 in the lower tool 27. The tension screw 44 can be inserted into the hole 45 by an operator of the work station 2 so as to releasably couple the upper tool 26 with the lower tool 27.

As an additional or an alternative variant for the coupling 42, FIG. 4 shows an electromagnet 46 arranged in the upper tool 26, said electromagnet 46 cooperating with a complementary countermagnet 47, e.g. a permanent magnet. The electromagnet 46 and the countermagnet 47 are arranged such that they are disposed in directly opposite relationship with one another in the closed condition of the tool. When the electromagnet 46 has power supplied thereto in an adequate manner, it develops a magnetic field, and the force of said magnetic field acting on the countermagnet 47 is sufficiently large for releasably coupling (possibly together with other fastening elements 43 of the coupling 42) the lower tool 27 to the upper tool 26. This coupling 42 is, in any case, strong enough for carrying the weight of the lower tool 27, when the latter is suspended from the upper tool 26.

An additional variant of the coupling 42 could be a controllable mechanical looking device 48. In FIG. 4, the locking device is outlined as a locking hook 48, which is adapted to be swiveled about a swiveling axis 49 manually or by means of a suitable electric or pneumatic drive. Having reached an adequate swiveling position, the locking hook 48 comes into engagement with a suitable locking recess in the lower tool 27.

In addition, FIG. 4 shows a tool changing carriage 50, which is adapted to be moved into the work station 2, at least partially, so as to raise the tool. To this end, the work station 2 is provided with an aperture, which, if necessary, can be uncovered by opening a flap provided in the lateral cladding panel 39 and which allows the tool changing carriage 50 to enter.

The tool changing carriage 50 is provided with a comparatively heavy base 51, which displaces the centre of gravity downwards and which is movable on a floor space 53 by means of rollers 52. The tool changing carriage 50 is additionally provided with a cantilever 54 mounted in a vertically adjustable manner on a frame 55 that is vertically secured to the base 51. The upper tool 26 is provided with coupling elements 56 by means of which said upper tool 26 can releasably be coupled to the cantilever 54. The coupling elements 56 may be loops which are adapted to be inserted in the cantilever 54.

When—as shown in FIG. 4—the tool changing carriage 50 has partially entered the work station 2, the cantilever 54 extends above the upper tool 26. The cantilever 54 can, e.g. by being extended to the front, be coupled to the coupling elements 56 on the upper tool 26. These coupling elements are able to carry the weight of the upper tool 26 as well as the weight of the lower tool 27 coupled to said upper tool 26.

Figure 5:
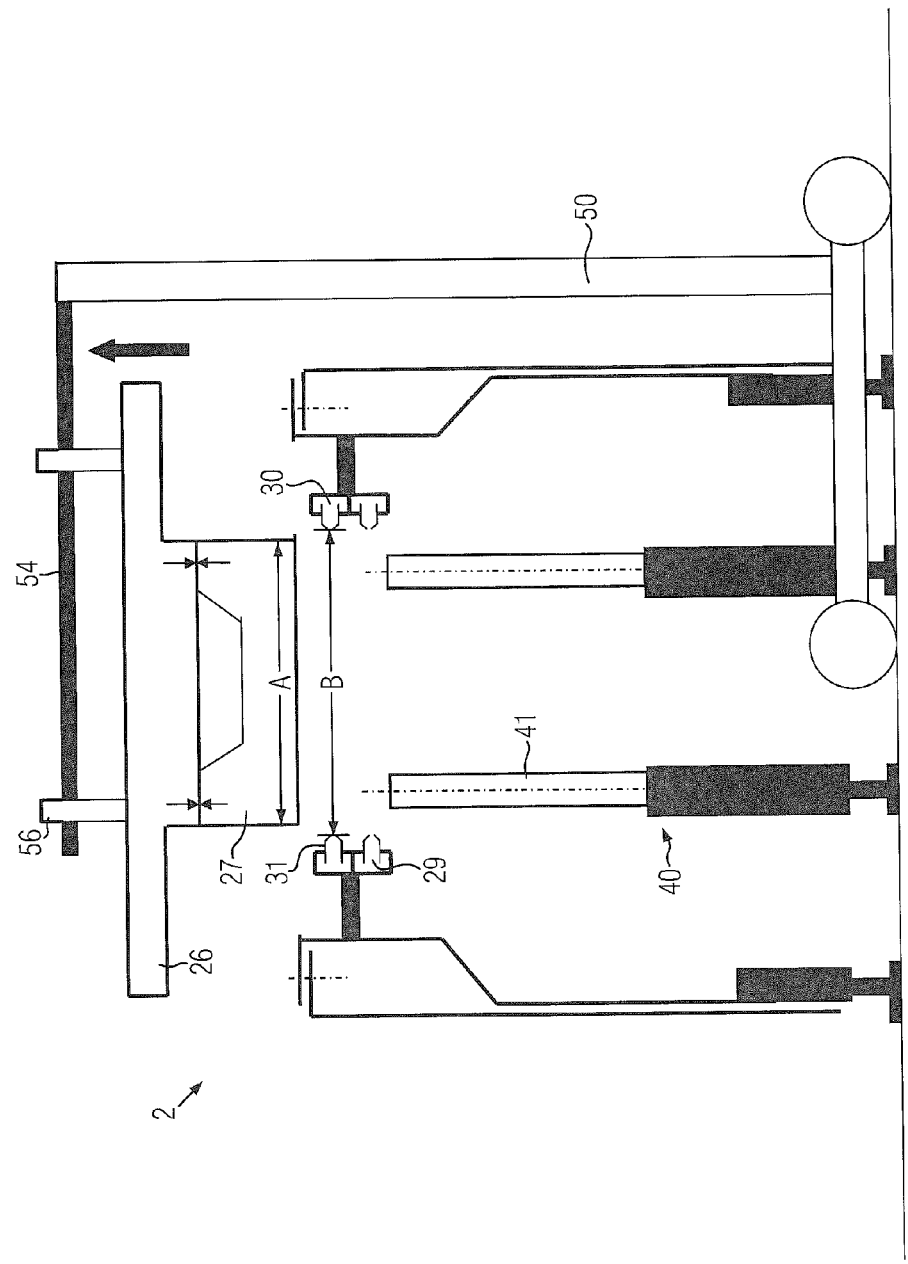

FIG. 5 shows the condition of the work station 2 when the cantilever 54 of the tool changing carriage 50 has been raised. This raising is indicated by an arrow. The coupling elements 56 on the upper tool 26 are coupled to the cantilever 54. The upper tool 26, in turn, is coupled via the coupling 42 to the lower tool 27. When the cantilever 54 is raised, the upper tool 26 as well as the lower tool 27 are raised. In the course of this process, the lower tool 27 is lifted off the telescope bars 41 of the lifting unit 40. In a direction transversely to the direction of transport R, the maximum dimension A of the lower tool 27 is smaller than the horizontal distance B between the clamping elements 31 of the two lateral transport chains 29, 30. The lower tool 27 can thus be removed from the forming station 2 vertically upwards, without any necessity of removing the clamp chains 29, 30 or their chain guides 32, 33. By means of the tool carriage 50, the tool 26, 27 can be raised such that it can be removed from the forming station 2 in a horizontal direction, when the tool changing carriage 50 is moved sidewards by means of the rollers 52.

When the packaging machine 1 according to the present invention is in operation and for carrying out the method according to the present invention, the work station tool defined by the lower tool 27 and the upper tool 26 is moved to its closed position. At this closed position the upper and lower tools 26, 27 are coupled by means of the coupling 42. To this end, an operator passes e.g. tension screws 44 through the upper tool 26 into a hole 45 provided in the lower tool 27. Subsequently, a tool changing carriage 50 is moved into the work station 2. Coupling elements 56 couple the upper tool 26 to a cantilever 54 of the tool changing carriage 50.

When the cantilever 54 is raised, both the upper tool 26 and the lower tool 27 coupled thereto are removed from the work station 2 in an upward direction. Insertion of a new tool takes place in an exactly reverse order. To this end, the new tool is positioned above the work station 2 by means of a tool changing carriage 50 and lowered by lowering the cantilever 54. As soon as the lower tool 27 has reached its final position, the coupling 42 can be released. Subsequently, operation of the work station 2 can be started.

As has already been stated, it is imaginable that the tools 26, 27 of the work station 2 are adjustable in the direction of transport R. An exchange or removal of the tools will be facilitated when, in spite of these adjustment possibilities, there is a fixed, predetermined tool changing position at which the tool changing carriage 50 can remove the tools. This facilitates a largely automated tool changing procedure. When such a predetermined tool changing position exists, the tool parts 26, 27 can, if necessary, first be moved from a working position to the tool changing position by means of the adjustment unit 23 so as to be exchanged there by means of the tool changing carriage 50. Insertion of new tool parts 26, 27 then takes place in an exactly reverse order.

Starting from the embodiment shown, the work station 2 according to the present invention, the packaging machine 1 according to the present invention and the method according to the present invention can be modified in many respects. It is e.g. imaginable that an exchange of tools does not take place at a forming station 2, but at a sealing station 3 or at a cutting station 4, 5. Likewise, it would be imaginable to remove the tool parts 26, 27 by a crane which is permanently installed in a machine hall, instead of removing them by a tool changing carriage 50. Finally, the machine 1 may also be a tray sealer, a chamber machine or a some other type of machine

The invention claimed is:

1. A work station for a packaging machine, comprising an upper tool and a lower tool arranged below the upper tool, wherein said upper and lower tools are configured for acting on a packaging web, and wherein a lifting unit is provided for moving at least one of said upper and lower tools between at least one lowered position and at least one raised position, so that, in one of said two positions, said upper and lower tools abut on one another or are spaced apart at a smaller distance than in the other position,
wherein in the position in which the upper tool and the lower tool abut on one another or are spaced apart at a smaller distance than in the other position, said upper and lower tools are adapted to be coupled to one another by a releasable coupling, wherein the releasable coupling is actuatable between an uncoupled state in which the upper tool and the lower tool are uncoupled and in which the lifting unit only moves one of the tools, and a coupled state in which the upper tool, the lower tool, and the releasable coupling can be removed from the work station in common.

2. A work station according to claim 1, wherein the coupling comprises mechanical fastening elements.

3. A work station according to claim 1, wherein the coupling comprises one or a plurality of screws.

4. A work station according to claim 1, wherein the coupling comprises at least one controllable locking device.

5. A work station according to claim 4, wherein the at least one locking device is adapted to be driven manually, electrically and/or by means of pressurized air.

6. A work station according to claim 1 further comprising two lateral transport chains for transporting the packaging web in a direction of transport, and wherein in a direction transversely to the direction of transport of the packaging web, the maximum dimension of the lower tool is smaller than the distance between the two transport chains.

7. A work station according to claim 1, wherein the lower tool is adapted to be releasably connected to the lifting unit.

8. A work station according to claim 1 further comprising an adjustment unit for adjusting the position of the upper and/or lower tools in a direction of transport of the packaging web.

9. A work station according to claim 8, wherein the adjustment unit includes at least one guide rail.

10. A work station according to claim 1, wherein a tool changing carriage can, at least partially, be moved into the work station.

11. A work station according to claim 1, the work station begin implemented with the packaging machine.

* * * * *